United States Patent
Hsieh et al.

(10) Patent No.: US 6,669,999 B2
(45) Date of Patent: Dec. 30, 2003

(54) METHOD FOR BROADENING BANDWIDTH OF CHOLESTERIC LIQUID CRYSTAL

(75) Inventors: Pao-Ju Hsieh, Hsinchu (TW); Hui-Lung Kuo, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 77 days.

(21) Appl. No.: 09/871,397

(22) Filed: May 30, 2001

(65) Prior Publication Data
US 2002/0180912 A1 Dec. 5, 2002

(51) Int. Cl.$^7$ .............................................. C09K 19/00
(52) U.S. Cl. .................. 428/1.3; 252/299.01; 349/175; 349/179
(58) Field of Search ............................ 252/299.01, 585, 252/299.7; 428/1.1, 1.31; 350/350 R, 350 S; 349/175, 179, 98, 167

(56) References Cited

U.S. PATENT DOCUMENTS 4,988,458 A * 1/1991 Heppke et al. ........ 252/299.63
5,071,589 A * 12/1991 Diibal et al. ........... 252/299.61
5,250,222 A * 10/1993 Kelly et al. ............ 252/299.66

* cited by examiner

Primary Examiner—Mark F. Huff
Assistant Examiner—Jennifer R. Sadula
(74) Attorney, Agent, or Firm—W. Wayne Liauh

(57) ABSTRACT

A method for making broadband cholesteric liquid crystals with improved bandwidth. The method includes the main steps of: (a) preparing a polymerization mixture containing first and second chiral liquid crystals, wherein the first chiral liquid crystal possesses a cholesteric liquid crystal phase and the second chiral liquid crystal possesses a helix-inversion characteristic, and at least one of the first or second chiral liquid crystals contains a polymerizable functional group; and (b) subjecting the polymerization mixture to a polymerization reaction, wherein the polymerization reaction is conducted such that the first chiral liquid crystal will go through a helix-inversion phenomenon. In a preferred embodiment, the second chiral liquid crystal has a temperature-dependent helicity which exhibits a helix inversion characteristic at a helix inversion temperature.

20 Claims, 1 Drawing Sheet

METHOD FOR BROADENING BANDWIDTH OF CHOLESTERIC LIQUID CRYSTAL

FIELD OF THE INVENTION

The present invention relates to an improved broadband cholesteric liquid crystals for use as circular reflective polarizers. More specifically, the present invention relates to a novel method to increase the bandwidth of circular reflective polarizers utilizing a broadband cholesteric liquid crystal, which can be advantageously utilized in making liquid crystal displays including, for example, super twisted nematic liquid displays. Unlike many of the prior art methods, the method disclosed in the present invention can be relatively easy and inexpensive to implement.

BACKGROUND OF THE INVENTION

Liquid crystal displays (LCD) are gaining increased popularity in the consumer electronics market. Because they occupy a substantially smaller desktop space than the traditional CRTs, LCD monitors have the potential of replacing the traditional CRT-based monitors, if the price gap can be reduced and the brightness of an LCD monitor can be improved. The brightness problem is associated with the fact that the current generations of LCDs utilize linear polarizers, which absorb light in the optical path. At the present time, even the most advanced liquid crystal displays show a reduced brightness caused by the linear polarizers that are used in the displays. Typically, in a backlit display, the commonly used dichoric linear polarizers can absorb more than 50–60% of the light intensity from the backlight. Since the backlight component typically consumes the greatest extent of electric power relative to other components in a portable computer, improvement in the amount of light absorption will greatly enhance the battery life.

Recently, circular reflective polarizers (CRP), which are also simply called "reflective polarizers", have been developed which can more efficiently convert unpolarized light into polarized light. Circular reflective polarizers, which can provide the same function as linear dichloric polarizers, usually comprise a layer of a chiral liquid crystalline material, such as a cholesteric liquid crystal, that exhibits a helically twisted molecular structure and further exhibits a planar alignment. If unpolarized light is incident upon a CRP, the portion of the light with the same handedness (i.e., same right-handedness or left-handedness) with the CRP will be reflected as circularly polarized light, while the other portions will be transmitted. By utilizing a properly designed mirror, the reflected light will have its handedness reversed which is then redirected into and passes through the CRP. Thus, in theory, one hundred percent of the a given unpolarized light can be converted into circularly polarized light using a circular reflective polarizer.

Cholesteric liquid crystals, or cholesteric LC, are a type of optically active liquid crystalline materials which have a helical arrangement of the molecular directors from layer to layer. Cholesteric liquid crystals are usually utilized in the form of a thin optically active layer between two parallel substrates in such a way that the axis of the helix is perpendicular to the substrate surfaces. Conforming to the definition of a circular polarizer, if such a thin layer containing the cholesteric liquid crystals is irradiated with a beam of unpolarized light, the part of the light which has the same handedness as the chiral molecules (which can be either right-handed or left-handed helixes) will be reflected, while the remainder of the light (which has the opposite handedness as the chiral molecules) is transmitted. The reflected light is reversed in its handedness by a mirror provided on the backlight device. The reflected light, which originally had the same handedness but now with opposite handedness, then transmits through this optically active layer this time around. As discussed previously, theoretically, 100% of the backlight can be transmitted through the cholesteric liquid crystals.

However, the cholesteric reflection occurs only within a spectral band between two wavelengths $\lambda_1$ and $\lambda_2$:

$$\lambda_1 = p \times n_1$$

and $$\lambda_2 = p \times n_2$$

where p is the pitch of the cholesteric molecule, and $n_1$ and $n_2$ are denoted as the ordinary and extraordinary reflective index of the material. And the bandwidth $\Delta\lambda$, where the cholesteric reflection occurs, is determined by the following equation:

$$\Delta\lambda = p \times (n_1 - n_2) = p \times \Delta n$$

In order to increase the bandwidth of the cholesteric liquid crystals, one must either choose a material with a large difference in the refractive indices (or higher birefringence), $\Delta n$, or by mixing different cholesteric liquid crystals with overlapping pitches. Since there is only a limited range within which the amount of $\Delta n$ can be increased, most researchers are focusing on modifying the pitches of the cholesteric liquid crystals.

U.S. Pat. No. 5,506,704 (WO 9,602,016) discloses a broadband cholesteric polarizer comprising an optically active layer of a polymer material. The polymer material has a cholesteric order and a molecular helix, wherein the pitch of the molecular helix varies with a difference between a maximum pitch and a minimum pitch of at least 100 nm. The cholesteric polarizer is formed by mixing chiral and nematogenic monomers, each having a different reactivity, between two parallel substrates. An actinic radiation is applied in accordance with a radiation profile whose intensity varies over the layer, so that the mixture is polymerized to an optically active layer of polymer material having a cholesteric order.

U.S. Pat. No. 5,691,789 discloses a broadband, reflective circular polarizer. The polarizers are made from a film of a polymer having a cholesteric order, in which a second liquid crystal material, which is a nematic liquid crystal, is distributed in a non-linear fashion across the thickness of the film in a plurality of liquid crystal-rich and liquid crystal-depleted sites in the polymer. The inventors claim that the resulting polarizers have bandwidth approaching 2000 nm and reflect circularly polarized light which is either left-handed or right-handed depending on the final spiral structure of the materials utilized. The circular polarizer the '789 invention is fabricated by mixing commercially available polymers having a cholesteric order, a second liquid crystal material and a photoinitiator at a temperature which maintains the mixture in a liquid crystalline state. The polymer and the liquid crystal are present in a ratio by weight of 1:2, for example, and the photoinitiator is present in an amount of 0.6% by weight in the mixture. The heated mixture is then subjected to actinic radiation for a time and at an intensity sufficient to polymerize the polymer or the liquid crystal material or both. Under all polymerizing conditions the segregation rate of the liquid crystal material has to be greater than the polymerization rate of the material being polymerized. The non-reactive liquid crystal segregates and diffuses, during polymerization, to sites of enlarged pitch in the polymer material from sites of shrunken pitch in the polymer material. Because the actinic light has an exponential intensity distribution due to light attenuation by light absorption, polymerization occurs in a non-linear fashion resulting in a non-linear distribution of the polymer and the liquid crystal material across the film.

U.S. Pat. No. 6,099,758 discloses a broadband reflective polarizer that comprises a layer of a polymerized mesogenic material exhibiting a helically twisted molecular structure with planar alignment. The reflective polarizer in the '758 patent is obtained by a process wherein a mixture of a chiral polymerizable mesogenic material comprising a) at least one achiral polymerizable mesogenic compound, b) at least one chiral compound that can in addition be polymerizable and/or mesogenic, c) a polymerization initiator, is coated on a substrate or between two substrates in form of a layer, aligned in a planar orientation so that the axis of the molecular helix extends transversely to the layer, and polymerized by exposure to heat or actinic radiation. The polymerizable material is coated and polymerized between two different substrates, and/or at least one of the substrates comprises a barrier layer on the surface adjacent to the layer of the polymerizable material, to a process of preparing such a broadband reflective polarizer and to a liquid crystal display comprising such a broadband reflective polarizer.

U.S. Pat. No. 6,057,008 discloses a process for broadening the bandwidth of photopolymerizable cholesteric liquid crystals. The process comprises the steps of: (1) partial polymerization of a layer containing photopolymerizable cholesteric liquid crystals by exposure to actinic light for a defined brief period at a defined temperature, 2) observance of a defined waiting time without exposure (dark phase) at a defined temperature, 3) fixing of the resultant layer by exposure to actinic light at a defined temperature.

U.S. Pat. No. 6,071,438 discloses a process for preparing oriented, three-dimensionally crosslinked polymeric materials having a broadened cholesteric reflection band relative to the same polymeric material not brought into contact with a solvent or a solvent mixture. The process comprises the steps of extracting partially crosslinked cholesteric polymer by bringing polymeric materials having cholesteric properties and an extractable material content into contact with a solvent or solvent mixture.

U.S. Pat. No. 5,999,243 discloses a liquid crystal element which comprises either a layer of an oriented liquid crystal polymer, or a substrate and formed thereon the layer of an oriented liquid crystal polymer. The liquid crystal polymer layer has an average in-plane haze of 10% or higher and having a dispersion of the in-plane haze H (%) within the range represented by the relationship $a-\sqrt{(10a)} \leq H \leq \sqrt{(10a)}$ wherein "a" is the average haze (%).

U.S. Pat. No. 6,061,108 discloses a broadband cholesteric polariser comprising at least one pair of adjacent layers, wherein the at least one pair of adjacent layers comprises a cholesteric layer and a compensating layer. The compensating layer has a refractive index perpendicular to the compensating layer greater than a refractive index oriented within the compensating layer. The at least one pair of adjacent layers comprise a plurality of pairs of adjacent layers containing cholesteric layers and compensating layers and each of the cholesteric layers has a different average pitch.

SUMMARY OF THE INVENTION

The primary object of the present invention is to develop a method for preparing cholesteric liquid crystals with increased bandwidth and the cholesteric liquid crystals prepared therefrom. More specifically, the primary object of the present invention is to develop a novel method which can substantially increase the bandwidth of a cholesteric liquid crystal so that it can be advantageously utilized as a circular polarizer in a liquid crystal display.

One of the key elements of the present invention is to incorporate a special chiral liquid crystal, which possesses the so-called "helix inversion" characteristic, in a co-polymerization reaction for preparing broadband cholesteric liquid crystals. The co-polymerization reaction is conducted such that this special chiral liquid crystal will go through such helix inversion phenomenon. The inventors of the present invention have discovered that, by using such a novel approach which involves a special "helix inversion" chiral liquid crystal, a substantially wider variation in the pitch size of another chiral liquid crystal, which possesses a cholesteric liquid crystal phase and is being co-polymerized with the special chiral liquid crystal, can be achieved, resulting in a broadband reflective polarizer.

The novel method for preparing broadband cholesteric liquid crystals of the present invention can be summarized as comprising the following main steps:

(1) preparing a co-polymerization mixture containing first and second chiral liquid crystals, the first chiral liquid crystal possessing a cholesteric liquid crystal phase and the second chiral liquid crystal possessing a helix-inversion characteristic, and at least one of said first or second chiral liquid crystals is polymerizable; and (2) subjecting the co-polymerization mixture to a polymerization reaction, wherein the polymerization reaction is conducted such that the first chiral liquid crystal will go through the helix-inversion.

A number of factors can induce such helix inversion, such as changes in temperature or electrical or magnetic fields. In this disclosure, our focus will be on the temperature-induced helix inversion. Furthermore, the chiral liquid crystal possessing a cholesteric liquid crystal phase can be a chiral cholesteric liquid crystal, a chiral nematic liquid crystal, or a mixture of nematic liquid crystal and cholesteric liquid crystal.

In a preferred embodiment of the present invention, the cholesteric liquid crystals are prepared involving a temperature-induced helix inversion process which comprises the following main steps:

(1) preparing a co-polymerization mixture containing: (a) a first liquid crystal having a cholesteric liquid crystal phase and (b) a second chiral liquid crystal having a temperature-dependent helicity with a helix inversion temperature; and (2) subjecting the co-polymerization mixture to a non-isothermal polymerization reaction, wherein the polymerization reaction takes place over a temperature span which encompasses the helix inversion temperature.

The definition of "helicity" of a chiral liquid crystal includes the direction (i.e., either left-handedness or right-handedness) of the helix and the pitch thereof. The effect of adding a chiral liquid crystal to a cholesteric liquid crystal is that, in the presence of a chiral liquid crystal of the same helical direction (i.e., same left-handedness or same right-handedness), the helical structure of the cholesteric liquid crystal will be "tightened", resulting in a decrease in the pitch of the cholesteric liquid crystal (similar to the "blue-shift" phenomenon). On the other hand, in the presence of a chiral liquid crystal of the opposite helical direction (i.e., a left-handed chiral liquid crystal added a right-handed cholesteric liquid crystal, or vice versa), the helical structure of the cholesteric liquid crystal will be "loosened" resulting in an increase in the pitch of the cholesteric liquid crystal (similar to the "red-shift" phenomenon). The pitch of the chiral liquid crystal also affects the extent the red-shift or blue-shift occurs in the cholesteric liquid crystals.

With the present invention, which adds a chiral liquid crystal having a temperature-dependent helicity into the cholesteric liquid crystal, and then subjects the mixture to a non-isothermal polymerization reaction, because the pitch of the chiral liquid crystal varies during the polymerization reaction, the pitch of the cholesteric liquid crystals also changes, resulting in a broadband cholesteric liquid crystal. Furthermore, since the non-isothermal polymerization reaction has a temperature span that encompasses the helix inversion temperature, which causes the cholesteric liquid crystals to experience from a red-shift to a blue-shift, or vice versa, the effective reflection bandwidth of the cholesteric liquid crystals is further increased.

Examples of the chiral liquid crystals which exhibit such helix inversion temperature include chiral diesters described in U.S. Pat. No. 4,988,458, which include the following compounds:

2,3-bis-[4-(trans-4-n-pentyl-cyclohexyl)-benzoyloxy]-butane, 2.3-bis-[4-(trans-4-n-heptyl-cyclohexyl)-benzoyloxy]-butane, 2,3-bis-[4-(4-n-hexyloxy-benzoyloxy)-benzoyloxy]-butane, 2,3-bis-(4,-trans-n-pentyl-cyclohexyl-4-diphenyl-carbonyloxy)-butane, 2,3-bis-(4,-trans-n-pentyl-4-trans-dicyclohexyl-carbonyloxy)-butane, 2,3-bis-[4-(4-n-hexyloxy-benzoyloxy)-benzoyloxy]-propane, 2,3-bis-[4-(trans-4-n-heptyl-cyclohexyl)-benzoyloxy]-propane, and 2,3-bis-(4,-trans-n-pentyl-4-trans-dicyclohexyl-carbonyloxy)-propane.

BRIEF DESCRIPTION OF THE DRAWING

The present invention will be described in detail with reference to the drawing showing the preferred embodiment of the present invention, wherein.

DETAILED DESCRIPTION OF THE PREFERRED EMBODIMENT

Figure 3:
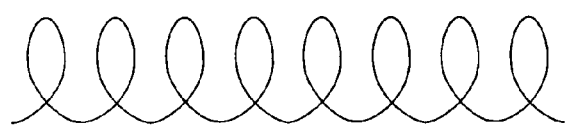
FIG. 3 is an illustrate diagram showing that the bandwidth the cholesteric liquid crystal is further increased by including a chiral liquid crystal with a helix inversion temperature in the exothermic polymerization reaction; the chiral liquid crystal exhibits a red shift below the helix inversion temperature, but blue-shift above the helix inversion temperature.

The present invention discloses a method for preparing cholesteric liquid crystals with increased reflection bandwidth and the cholesteric liquid crystals prepared therefrom. The improved broadband cholesteric liquid crystals so prepared can be advantageously utilized as a circular polarizer in a liquid crystal display.

As discussed above when a thin layer containing cholesteric liquid crystals is irradiated with a beam of unpolarized light, the part of the light which is compatible with the direction of the helical pitch of the cholesteric liquid crystal layers will be reflected, while the remainder of the light (which is incompatible or having a reversed helical direction of the chiral molecules) is transmitted. The transmitted light is reflected by a mirror formed on the backlight device, causing it to be reverse-polarized. The reflected light than transmits through this optically active layer. Theoretically, 100% of the backlight can be transmitted through the cholesteric reflective polarizer.

However, the cholesteric reflection occurs only within a spectral band between two wavelengths $\lambda_1$ and $\lambda_2$ wherein $\lambda_1 = p \times n_1$, $\lambda_2 = p \times n_2$, p is the pitch of the cholesteric molecule, and $n_1$ and $n_2$ are denoted as the ordinary and extraordinary reflective indexes, respectively, of the cholesteric material. The bandwidth $\Delta\lambda$, where the cholesteric reflection occurs, is determined by the equation of $\Delta\lambda = p \times (n_1 - n_2) = p \times \Delta n$. In order to increase the bandwidth of the cholesteric liquid crystals, one must either choose a material with a large difference in the refractive indices, $\Delta n$, or by mixing different cholesteric liquid crystals with overlapping pitches. Since there is only a limited range within which the amount of $\Delta n$ can be increased, most researchers are focusing on modifying the pitches of the cholesteric liquid crystals.

In the present invention, a family of cholesteric liquid crystals are formed to provided increased bandwidth so that they can be advantageously employed as circular reflective polarizers. The cholesteric liquid crystals of the present invention are formed using a novel process which comprises the following main steps:

(a) preparing a co-polymerization mixture containing first and second chiral liquid crystals, the first chiral liquid crystal possessing a cholesteric liquid crystal phase and the second chiral liquid crystal possessing a helix-inversion characteristic, and at least one of said first or second chiral liquid crystals contains a polymerizable functional group; and (b) subjecting the co-polymerization mixture to a polymerization reaction, wherein the polymerization reaction is conducted such that the second chiral liquid crystal will go through the helix-inversion.

A number of factors can cause such helix inversion phenonenon, such as changes in temperature or changes in the electrical or magnetic field. Furthermore, the chiral liquid crystal possessing a cholesteric liquid crystal phase can be a chiral cholesteric liquid crystal, a chiral nematic liquid crystal, or a mixture of nematic liquid crystal and cholesteric liquid crystal.

In a preferred embodiment of the present invention, the cholesteric liquid crystals are prepared involving a temperature-induced helix inversion process which comprises the following main steps:

(1) preparing a co-polymerization mixture containing: (a) a first chiral liquid crystal having a cholesteric liquid crystal phase and (b) a second chiral liquid crystal having a temperature-dependent helicity which exhibits a helix inversion characteristic at a helix inversion temperature; and (2) subjecting the co-polymerization mixture to a non-isothermal polymerization reaction, wherein said polymerization reaction takes place over a temperature span which encompasses the helix inversion temperature.

As discussed above, the definition of "helicity" of a chiral liquid crystal includes the direction (i.e., either left-handedness or right-handedness) of the helix and the pitch thereof. The effect of adding a chiral liquid crystal to a cholesteric liquid crystal is that, in the presence of a chiral liquid crystal of the same helical direction (i.e., same left-handedness or same right-handedness), the helical structure of the cholesteric liquid crystal will be "tightened", resulting in a decrease in the pitch of the cholesteric liquid crystal (similar to the "blue-shift" phenomenon). On the other hand, in the presence of a chiral liquid crystal of the opposite helical direction (i.e., a left-handed chiral liquid crystal added a right-handed cholesteric liquid crystal, or vice versa), the helical structure of the cholesteric liquid crystal will be "loosened" resulting in an increase in the pitch of the cholesteric liquid crystal (similar to the "red-shift" phenomenon). The pitch of the chiral liquid crystal also affects the extent the red-shift or blue-shift occurs in the cholesteric liquid crystals.

With the present invention, which adds a chiral liquid crystal having a temperature-dependent helicity into the cholesteric liquid crystal, then subjects the mixture to a non-isothermal polymerization reaction, because the pitch of the chiral liquid crystal varies during the polymerization reaction, the pitch of the cholesteric liquid crystals also changes, resulting in a broadband cholesteric liquid crystal. Furthermore, since the non-isothermal polymerization reaction has a temperature span that encompasses the helix inversion temperature, which causes the cholesteric liquid crystals to experience from a red-shift to a blue-shift, or vice versa, the bandwidth of the cholesteric liquid crystals is further increased.

Examples of the chiral liquid crystals which exhibit such helix inversion temperature include chiral diesters described in U.S. Pat. No. 4,988,458, which include the following compounds:

2,3-bis-[4-(trans-4-n-pentyl-cyclohexyl)-benzoyloxy]-butane, 2,3-bis-[4-(trans-4-n-heptyl-cyclohexyl)-benzoyloxy]-butane, 2,3-bis-[4-(4-n-hexyloxy-benzoyloxy)-benzoyloxy]-butane, 2,3-bis-(4,-trans-n-pentyl-cyclohexyl-4-diphenyl-carbonyloxy)-butane, 2,3-bis-(4,-trans-n-pentyl-4-trans-dicyclohexyl-carbonyloxy)-butane, 2,3-bis-[4-(4-n-hexyloxy-benzoyloxy)-benzoyloxy]-propane, 2,3-bis-[4-(trans-4-n-heptyl-cyclohexyl)-benzoyloxy]-propane, and 2,3-bis-(4,-trans-n-pentyl-4-trans-dicyclohexyl-carbonyloxy)-propane.

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

EXAMPLE 1

Figure 1:
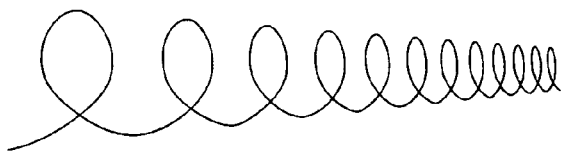
FIG. 1 is an illustrate diagram showing a helix-structured cholesteric liquid crystal with a constant pitch at constant temperature.

FIG. 1 is an illustrate diagram showing a typical helix-structured cholesteric liquid crystal with a constant pitch at constant temperature. In this example, a cholesteric liquid crystal is chosen whose pitch decreases with temperature.

Figure 2:
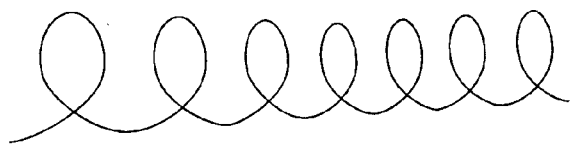
FIG. 2 is an illustrate diagram showing that the pitch of the cholesteric liquid crystal is reduced, or blue-shift, during an exothermic polymerization reaction.

Thus, following an exothermic polymerization reaction, the resultant polymer will exhibit a continual decrease in the pitch of the cholesteric liquid crystals contained therein. This is shown in FIG. 2.

With the addition of a chiral liquid crystal which exhibits a red shift (i.e., opposite helix direction as the cholesteric liquid crystals) below the helix inversion temperature, but blue-shift (i.e., same helix direction as the cholesteric liquid crystals) above the helix inversion temperature, the pitch of the cholesteric liquid crystals can be further "tightened" when the temperature moves into the blue-shift range. FIG. 3 is an illustrate diagram showing that the bandwidth the cholesteric liquid crystal is further increased by including such a chiral liquid crystal with a helix inversion temperature in the exothermic polymerization reaction. Both the cholesteric liquid crystals and the chiral liquid crystals can contain polymerizable functional groups or only either of these two monomers contains polymerizable functional groups. A quarter wave film can be added to the circular reflective polarizer to convert it into a linear polarizer.

It should be noted that, as discussed in the previous section, the helix inversion phenomenon can be induced by other factors, such as changes in the electric or magnetic field. The above discussions, which are focused on the temperature-induced helix inversion, can also be applied to other helix inversion phenomena. The key element is to co-polymerize a first chiral liquid crystal which possesses a helix-inversion characteristic with a second chiral liquid crystal which possesses a cholesteric liquid crystal phase, and control the polymerization condition (including the temperature or electric/magnetic field) so that first chiral liquid crystal will go through the helix-inversion. The result of the co-polymerization is a cholesteric liquid crystals with an expanded reflection bandwidth.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for preparing broadband cholesteric liquid crystals comprising the following steps:
   (a) preparing a co-polymerization mixture containing:
      (i) a first chiral liquid crystal having a cholesteric liquid crystal phase, and
      (ii) a second chiral liquid crystal having a temperature-dependent helicity and a helix inversion characteristic at a helix inversion temperature; and
   (b) subjecting said co-polymerization mixture to a non-isothermal polymerization reaction, wherein said co-polymerization reaction takes place over a temperature span which encompasses said helix inversion temperature.

2. The method of preparing broadband cholesteric liquid crystals according to claim 1 wherein said non-isothermal co-polymerization reaction is an exothermic reaction.

3. The method of preparing broadband cholesteric liquid crystals according to claim 2 wherein said first chiral liquid crystal has a pitch which decreases with temperature.

4. The method of preparing broadband cholesteric liquid crystals according to claim 3 wherein said second chiral liquid crystal has an opposite helical direction relative to said first chiral liquid crystal below said helix transition temperature and a same helical direction relative to said first chiral liquid crystal above said helix transition temperature.

5. The method of preparing broadband cholesteric liquid crystals according to claim 1 wherein both said first and second chiral liquid crystals contain functional groups for co-polymerization.

6. The method of preparing broadband cholesteric liquid crystals according to claim 1 wherein only either of said first or said second cholesteric liquid crystal contains functional groups for co-polymerization.

7. A method for preparing broadband cholesteric liquid crystals comprising the following steps:
   (a) preparing a co-polymerization mixture containing first and second chiral liquid crystals, wherein said first chiral liquid crystal possesses a cholesteric liquid crystal phase and said second chiral liquid crystal possesses a helix-inversion characteristic, and at least one of said first or second chiral liquid crystals contains a polymerizable functional group; and
   (b) subjecting said co-polymerization mixture to a polymerization reaction, wherein said polymerization reaction is conducted such that said first chiral liquid crystal will go through a helix-inversion phenomenon.

8. The method of preparing broadband cholesteric liquid crystals according to claim 7 wherein said second chiral liquid crystal has a temperature-dependent helicity and exhibits a helix inversion characteristic at a helix inversion temperature.

9. The method of preparing broadband cholesteric liquid crystals according to claim 8 wherein said polymerization reaction is a non-isothermal reaction which is controlled such that said polymerization reaction takes place over a temperature span which encompasses said helix inversion temperature.

10. The method of preparing broadband cholesteric liquid crystals according to claim 9 wherein said first chiral liquid crystal has a pitch which decreases with temperature.

11. The method of preparing broadband cholesteric liquid crystals according to claim 10 wherein said second chiral liquid crystal has an opposite helical direction relative to said first chiral liquid crystal below said helix transition temperature and a same helical direction relative to said first chiral liquid crystal above said helix transition temperature.

12. The method of preparing circular reflective polarizers according to claim 1 wherein said second chiral liquid crystal is a chiral diester.

13. The method of preparing circular reflective polarizers according to claim 7 wherein said chiral diester is selected from the group consisting of:
   2,3-bis-[4-(trans-4-n-pentyl-cyclohexyl)-benzoyloxy]-butane,
   2.3-bis-[4-(trans-4-n-heptyl-cyclohexyl)-benzoyloxy]-butane,
   2,3-bis-[4-(4-n-hexyloxy-benzoyloxy)-benzoyloxy]-butane,
   2,3-bis-(4,-trans-n-pentyl-cyclohexyl-4-diphenyl-carbonyloxy)-butane,
   2,3-bis-(4,-trans-n-pentyl-4-trans-dicyclohexyl-carbonyloxy)-butane,
   2,3-bis-[4-(4-n-hexyloxy-benzoyloxy)-benzoyloxy]-propane,
   2,3-bis-[4-(trans-4-n-heptyl-cyclohexyl)-benzoyloxy]-propane, and
   2,3-bis-(4,-trans-n-pentyl-4-trans-dicyclohexyl-carbonyloxy)-propane.

14. A liquid crystal display (LCD) containing a broadband cholesteric liquid crystals, wherein said broadband cholesteric liquid crystal is made using a process comprising the following steps:
   (a) preparing a co-polymerization mixture containing first and second chiral liquid crystals, wherein said first chiral liquid crystal possesses a cholesteric liquid crystal phase and said second chiral liquid crystal possesses a helix-inversion characteristic, and at least one of said first or second chiral liquid crystals contains a polymerizable functional group; and
   (b) subjecting said co-polymerization mixture to a polymerization reaction, wherein said polymerization reaction is conducted such that said first chiral liquid crystal will go through a helix-inversion phenomenon.

15. The liquid crystal display according to claim 14 wherein said second chiral liquid crystal has a temperature-dependent helicity and exhibits a helix inversion characteristic at a helix inversion temperature.

16. The liquid crystal display according to claim 15 wherein said polymerization reaction is a non-isothermal reaction which is controlled such that said polymerization reaction takes place over a temperature span which encompasses said helix inversion temperature.

17. The liquid crystal display according to claim 15 wherein said first chiral liquid crystal has a pitch which decreases with temperature.

18. The liquid crystal display according to claim 17 wherein said second chiral liquid crystal has an opposite helical direction relative to said first chiral liquid crystal below said helix transition temperature and a same helical direction relative to said first chiral liquid crystal above said helix transition temperature.

19. The liquid crystal display according to claim 14 wherein said second chiral liquid crystal is a chiral diester.

20. The liquid crystal display according to claim 19 wherein said chiral diester is selected from the group consisting of:
   2,3-bis-[4-(trans-4-n-pentyl-cyclohexyl)-benzoyloxy]-butane,
   2.3-bis-[4-(trans-4-n-heptyl-cyclohexyl)-benzoyloxy]-butane,
   2,3-bis-[4-(4-n-hexyloxy-benzoyloxy)-benzoyloxy]-butane,
   2,3-bis-(4,-trans-n-pentyl-cyclohexyl-4-diphenyl-carbonyloxy)-butane,
   2,3-bis-(4,-trans-n-pentyl-4-trans-dicyclohexyl-carbonyloxy)-butane,
   2,3-bis-[4-(4-n-hexyloxy-benzoyloxy)-benzoyloxy]-propane,
   2,3-bis-[4-(trans-4-n-heptyl-cyclohexyl)-benzoyloxy]-propane, and
   2,3-bis-(4,-trans-n-pentyl-4-trans-dicyclohexyl-carbonyloxy)-propane.

* * * * *